(12) United States Patent
Mores

(10) Patent No.: US 6,388,463 B1
(45) Date of Patent: May 14, 2002

(54) CIRCUIT ARRANGEMENT FOR BIAS ADJUSTMENT OF BUS LEVELS

(75) Inventor: Robert Mores, Hamburg (DE)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/389,178

(22) Filed: Sep. 2, 1999

(30) Foreign Application Priority Data

Sep. 3, 1998 (DE) .......................... 198 40 086

(51) Int. Cl.⁷ .............................................. H03K 17/16
(52) U.S. Cl. .......................................... 326/30; 326/82
(58) Field of Search ............................. 326/30, 82, 83, 326/86, 21; 327/311, 314, 315

(56) References Cited

U.S. PATENT DOCUMENTS

| | | | | |
|---|---|---|---|---|
| 4,220,876 A | * | 9/1980 | Ray .............................. | 326/30 |
| 5,220,211 A | * | 6/1993 | Christopher et al. .......... | 326/30 |
| 5,317,215 A | * | 5/1994 | Kranzler ....................... | 326/30 |
| 5,374,861 A | * | 12/1994 | Kubista ........................ | 326/30 |
| 5,523,703 A | * | 6/1996 | Yamamoto et al. ............ | 326/30 |
| 5,602,494 A | * | 2/1997 | Sundstrom .................... | 326/30 |

FOREIGN PATENT DOCUMENTS

EP 0288740 11/1988

* cited by examiner

*Primary Examiner*—Michael Tokar
*Assistant Examiner*—Don Phu Le
(74) *Attorney, Agent, or Firm*—Daniel J. Piotrowski

(57) ABSTRACT

In a system for the transmission of logic levels via a bus the recessive level, being of higher impedance in comparison with the dominant level, is not adjusted by means of a resistor but by means of a termination arrangement with three break points in the current/voltage diagram. In the third quadrant of the current/voltage diagram this termination arrangement has a resistance which is higher than that of a lead terminated by means of a linear resistor. In the first quadrant the rise of the characteristic up to a voltage below a receiving threshold is steeper than in the case of termination by means of a resistor. Subsequently, in the first quadrant the characteristic is subject to a current limitation which is effective from a voltage below the receiving threshold to a value beyond the working point of the dominant driver. Beyond the working point of the dominant driver the current limitation is removed again, so that the rise is steeper than in the case of termination by means of a resistor. This termination arrangement optimizes the ratio of the value of the driver currents, and the associated radiation via the bus, to the speed at which a level is adjusted on the bus. Moreover, the tolerance in respect of ground offset is thus improved and also the resistance to radiation.

4 Claims, 4 Drawing Sheets

CIRCUIT ARRANGEMENT FOR BIAS ADJUSTMENT OF BUS LEVELS

The invention relates to a circuit arrangement for bias adjustment of bus levels or a system for the transmission of binary data via at least one lead whereto a plurality of stations with transmitters and receivers with preceding low-pass filters are connected, which lead carries a recessive level and can be switched to a dominant level by a transmitter.

Possible fields of application of such systems are the networking of control devices or finished apparatus, notably in automotive and industrial electronics. Very strong interference occurs in such environments, for example due to the switching on of large loads, so that special requirements are imposed as regards the transmission reliability.

Until now transmission system are known in which the recessive level is adjusted by means of a resistor and the dominant level is fed by means of a driver. The impedance of the driver is lower than the resistance, so that interference signals which could unduly imitate a recessive signal are less likely to occur in the case of the dominant level than interference signals which could imitate a dominant signal in the case of recessive levels.

In order to avoid transmission errors due to ground offset and electromagnetic radiation, as large as possible level differences are defined. The level difference, however, should not be too large, as otherwise radiation takes place due to large level differences.

Low impedance feeding of the recessive level imposes an even lower impedance feeding of the dominant level, resulting in larger currents which cause more radiation. When the recessive level is fed with a resistor and radiation takes place, the current increases further after having reached the receiver threshold. This leads to unnecessarily high radiation. The current is unnecessary because the resistance to radiation cannot be further improved by the current increased beyond the receiver threshold.

Therefore, it is an object of the invention to provide an arrangement which improves the resistance to radiation also for the recessive level.

This object is achieved in that the stations are provided with a termination arrangement which provides low-impedance termination of the lead in the case of a level beyond the dominant level.

The recessive level is permanently adjusted on the lead by all participating stations. The working point of the recessive driver lies at, for example 0 V. When the radiation levels increase beyond the working point of the driver, the current may increase again without affecting the current in the working point which is relevant to the radiation. Thus, a lower resistance is also achieved for high radiation levels in the first quadrant. Because the impedance of the driver is lower for positive voltages than for negative voltages, in the case of radiation during a recessive level the direct voltage level will preferably move even more clearly in the direction of recessive levels, so that the logic evaluation remains recessive in any case. The mean voltage value moves towards recessive, because the voltages coupled in by a disturbance are attenuated more in the range of the positive voltage than in the range of the negative voltages. The dominant level is not affected thereby, because the impedance of the driver is usually very low.

Preferably, the circuit arrangement includes a current source termination arrangement which optimizes the ratio of the currents on the bus, and the inherent radiation, to the speed at which the recessive level is adjusted.

A current source arrangement in the termination arrangement creates a constant current for the recessive levels in the case of radiation in the range from a voltage below the receiver threshold of the receiver to a voltage beyond the working point of the driver for the dominant level. It is thus achieved that the current does not increase linearly, and hence increases the radiation, during the recessive level and radiation. In the case of small amounts of radiation, the current on the lead increases linearly up to a voltage which lies below the receiver threshold. The rise of the current is then steeper than the rise of the current in the case of termination of the lead by means of a resistor.

In systems in which data is transmitted by means of two levels, i.e. a recessive and a dominant level, the speed at which the recessive level can be adjusted essentially defines the maximum transmission rate that can be achieved. The evaluation of the logic level at the receiving side is performed by means of the receiver and a preceding low-pass filter with a predetermined receiver threshold.

EP 0 288 740 describes a system in which the time for switching over between two binary level states is reduced by means of a trigger circuit which is connected to a bus lead. Therein, the bus lead is subdivided into lead segments, all lead segments being combined via logic gates in such a manner that switching over is accelerated.

In order to switch over the bus capacitance sufficiently quickly, thus achieving adequate speed for the desired data transmission rate notably during the adjustment of the recessive level, the difference between the levels must satisfy given criteria. According to the method in which the recessive level is adjusted by means of a resistor, the bus capacitance is first switched over with a large current and subsequently with a continuously decreasing current, i.e. in conformity with the linear current/voltage ratio at the resistor. In the current-limited termination arrangement according to the invention there is initially a constant current from the direction of the dominant level up to the receiver threshold. In the lower voltage range, near the zero point, the current-limited termination arrangement has a resistance which is lower than that in the case of termination by means of a linear resistor. The initially slower switching over of the bus capacitance, due to the current limitation, is thus compensated by the comparatively faster switching over near the end of the switching operation. Overall, equally fast or even faster switching over is thus achieved in comparison with that achieved by means of a linear resistor. The total current in the static dominant state is then significantly smaller so that the radiation is also less. At the same time, however, the resistance to radiation in the recessive state is better than in the case of a resistor, because overall the impedance of the termination of the recessive level overall is lower.

For the whole range of radiation to be expected, the impedance in the first quadrant in the current/voltage characteristic of the current-limited termination device is lower than that in the third quadrant.

The first quadrant of lower impedance, moreover, also has a favorable effect on the ground offset between the individual stations in said systems which occasionally occurs due to operating conditions or aging phenomena. In combination with the static receiving threshold such ground offset could lead to a less favorable signal-to-noise ratio. In systems in which ground offset occurs and the recessive level is adjusted by means of linear resistors, a recessive level is formed between the different ground potentials, that is to say with a weight of the linear resistors distributed across the stations. The receiving thresholds of the individual stations are always related to local ground and hence differ as much as the ground potentials. The signal-to-noise ratio thus becomes different for the stations and the resistance to radiation is reduced, so that incorrect detection of dominant levels could occur in receivers with such a ground offset.

When the recessive level is adjusted by means of a termination arrangement according to the invention, where the third quadrant is of higher impedance, or outputs less current, than the first quadrant, the recessive level is in principle adjusted nearer to the lower ground potential and overall a better signal-to-noise ratio is obtained for the stations.

The resistor is replaced by a termination arrangement and the current limitation at the individual stations is adjusted in such a manner that the sum of all currents enables the desired speed of adjustment of the recessive level while at the same time the current capability of the driver is not exceeded. The rises of the individual segments of the current/voltage characteristic can be programmed by parameter modification in such a manner that the recessive level is optimally sustained in the case of particularly frequent radiations. The possibility for integration of the current source represents a further advantage.

The current/voltage characteristic represents the relevant variation when the transmission lead is subjected to radiations which vary the current and the voltage on the line in the case of a normally recessively imposed level. The current/voltage characteristic of the termination arrangement for the recessive level is, for example a characteristic with three break points.

All steps and advantages can be used for differential systems if they are applied to two bus leads which are driven in a complementary fashion. The behavior of the driver for the second bus lead is symmetrical with respect to that for the first bus lead. The driver for the second bus lead thus has a higher impedance in the first quadrant than in the third quadrant. In the differentially operating systems a comparatively higher common mode range is generally tolerated so that a high resistance to radiation is possible.

Embodiments will be described in detail hereinafter with reference to the Figures. Therein:

Figure 1:
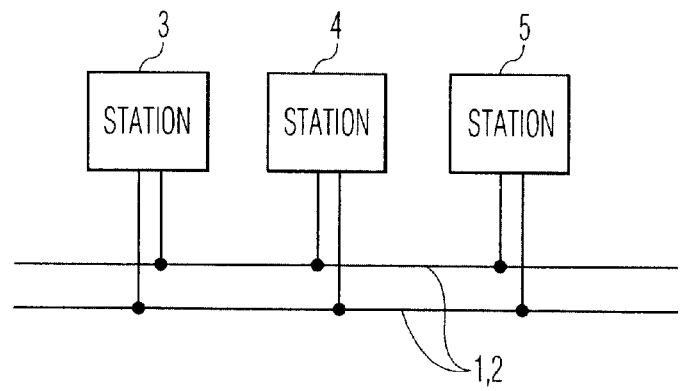
FIG. 1 shows a block diagram of the construction of a transmission system.

FIG. 1 shows a transmission system which includes a plurality of stations 3 to 5 which communicate via a differential bus which consists of two leads 1 and 2.

Figure 2:
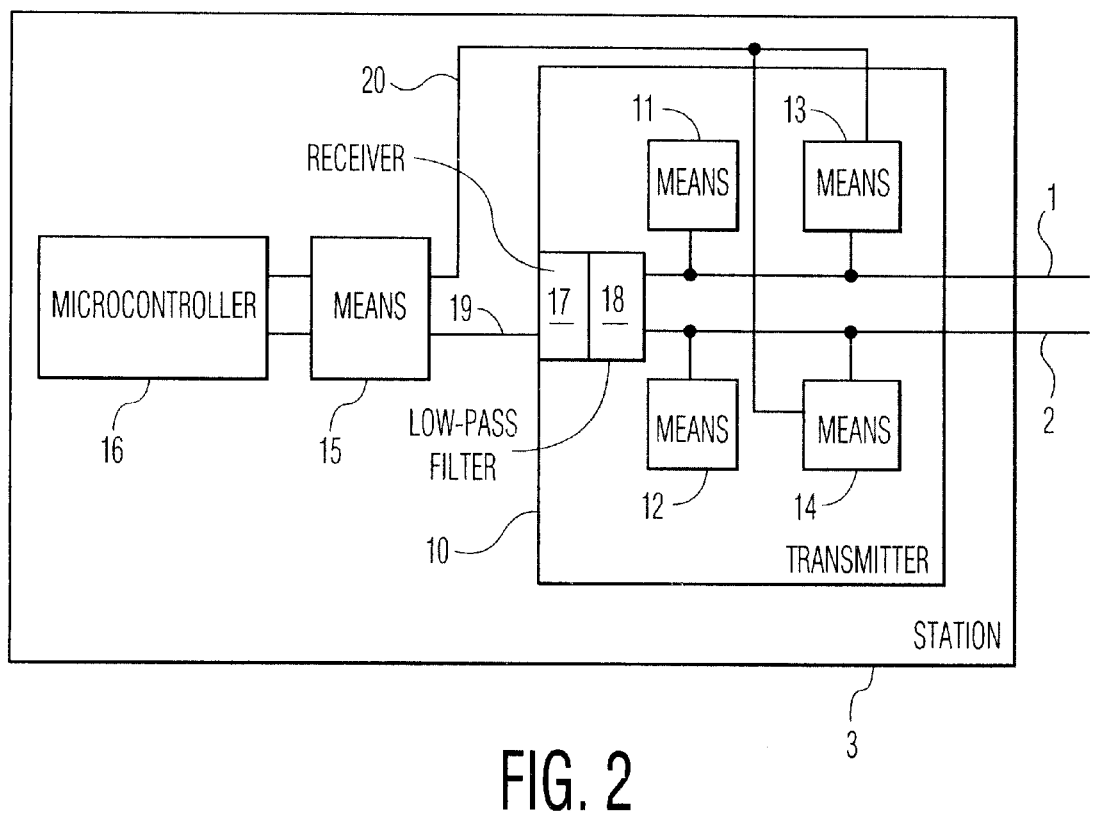
FIG. 2 shows a block diagram of the construction of a station.

FIG. 2 relates to a differential transmission system. FIG. 2 shows a station, for example the station 3 (FIG. 1), which includes a transmitter 10 which itself includes means 11 and 12 for the termination arrangement for recessive levels and means 13 and 14 for the transmission of dominant levels.

The transmitter also includes the receiver 17 with a preceding low-pass filter 18. The station 3 generally also includes means 15 for the execution of a data transmission protocol, which means are connected to the transmitter 10 via at least one transmission lead 20 and one receiving lead 19. A microcontroller 16 executes application-specific tasks. The means 11 perform the adjustment of a recessive level on the lead 1. A dominant level is fed to the lead 1 by the means 13. A recessive level is adjusted on the lead 2 by means of the means 12 and a dominant level is fed by the means 14.

Figure 3:
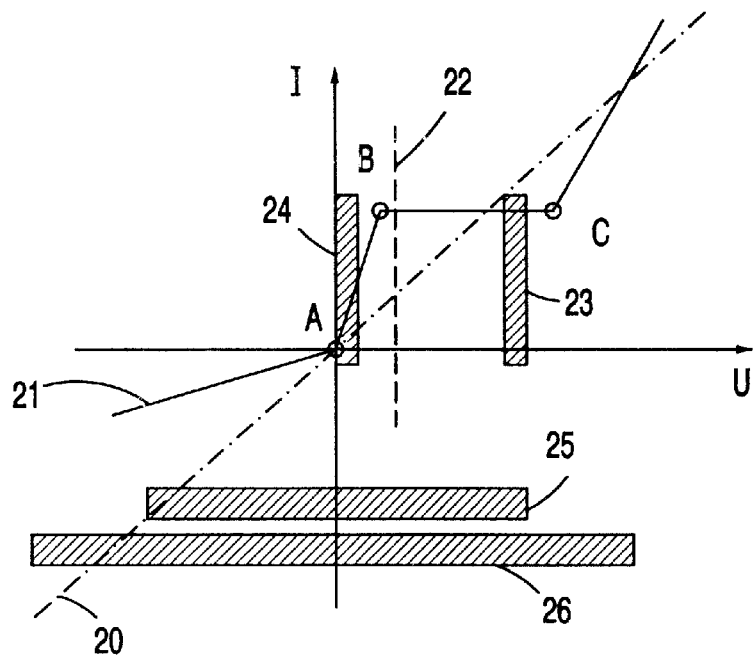
FIG. 3 shows a current/voltage characteristic for the adjustment of the recessive level by means of a linear resistor and for the adjustment by means of a current-limited termination arrangement.

FIG. 3 shows a current/voltage diagram for a lead in which the current/voltage characteristic 20 concerning the behavior of the recessive level in the case of radiation with a resistor is compared with the characteristic 21 for the behavior of the recessive level in the case of radiation with the termination arrangement according to the invention.

The characteristic 21 of the termination arrangement according to the invention has 3 break points A, B and C. It represents the behavior when the bus leads are subjected to radiation. In the normal case, i.e. when the recessive level 24 has been adjusted and no disturbance is present, the current/voltage values lie, for example near the zero point. The receiver recognizes radiation levels whose voltages are below the voltage of the receiver threshold 22 as recessive levels 24, and levels whose voltages exceed the voltage of the receiver threshold 22 as dominant levels 23.

It can be seen that the characteristic 21 in the third quadrant in this current/voltage diagram has a higher impedance in comparison with the first quadrant. When the receiver threshold 22 is reached for the characteristic 21, it is not necessary to make the current increase further. This can be recognized as from the point B in the characteristic 21, beyond which point the current limitation becomes active. This constant current is sustained until the working point 23 of the driver for the dominant level. The current limitation is deactivated only after that at the point C so as to allow the current to increase in the case of high radiation levels 26.

Upon switching over of the bus capacitance from the dominant to the recessive level, in the case of the characteristic 21, first a constant current flows until it drops below the receiving threshold 22, as opposed to the characteristic 20 where initially a larger current flows. Below the receiving threshold 22, however, the impedance of the driver is lower than the resistor, so that the bus capacitance is switched over with a larger current towards the end of the switching operation. Overall this results in switching over which is faster than by means of a resistor. Because the current-limited driver has a higher resistance in the third quadrant, the direct voltage level will move even more clearly in the direction of a recessive level during a recessive level in the presence of a low radiation level 25, so that the logic evaluation will remain recessive in any case.

Figure 4:
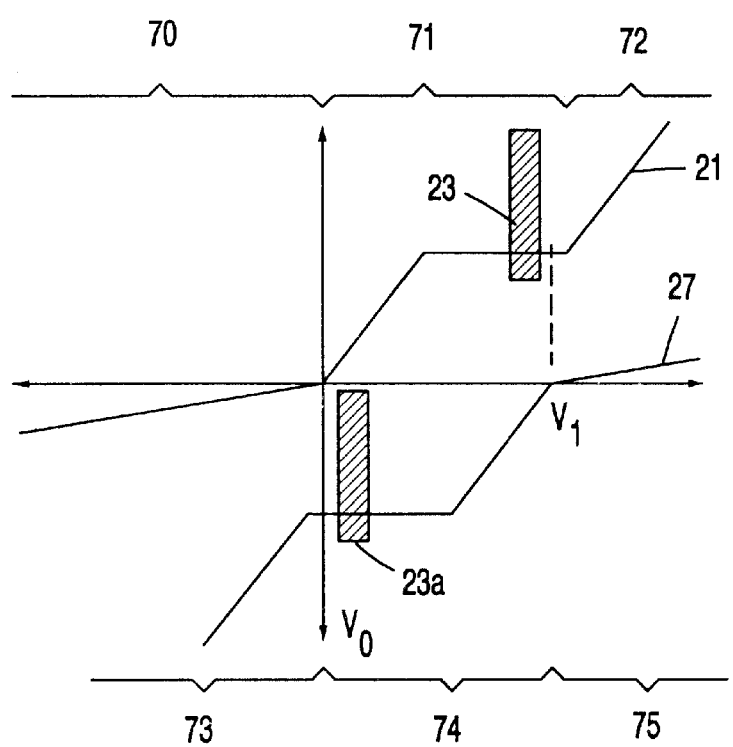
FIG. 4 shows a current/voltage characteristic for a differential transmission system.

FIG. 4 shows a current/voltage diagram for a differential system with the characteristics 21 for the current-limited termination arrangement for the first lead 1 and the characteristic 27 for the second lead. The behavior of the two termination arrangements is symmetrical. The termination arrangement of the characteristic 27 is of higher impedance in the first quadrant than in the third quadrant. This behavior exactly opposes the behavior of the termination arrangement for the characteristic 21, since the latter has a lower impedance in the first quadrant than in the third quadrant. The advantage of this differential transmission consists in that disturbances have the same effect on both leads, so that the radiated disturbances are eliminated by differentiation of the two signals upon evaluation of the transmitted signals.

Figure 5:
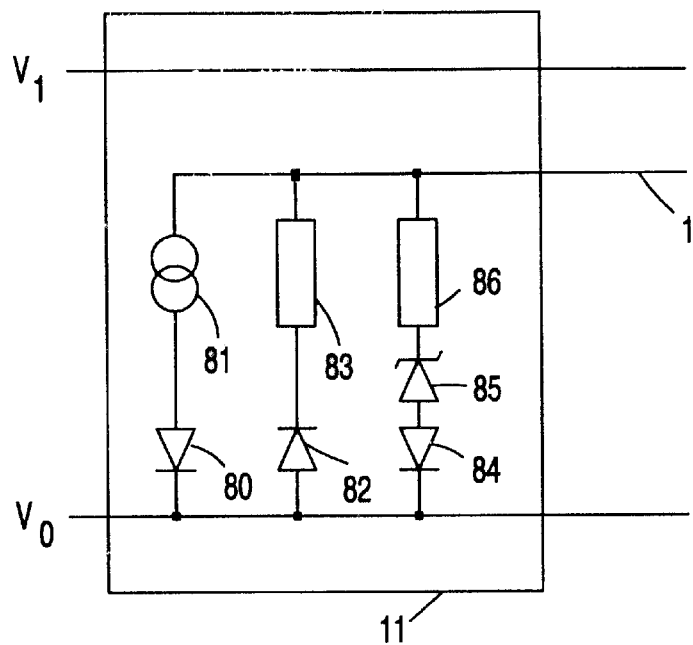
FIG. 5 shows a circuit arrangement for the termination arrangement for the recessive level on the lead 1.

FIG. 5 shows a circuit arrangement for the termination arrangement for, for example, means 11 on the lead 1. On the lead 1 a recessive level of a voltage $V_0$ is adjusted. The diode 80, in conjunction with the current source 81, essentially determines the current/voltage variation in the segment 71 from the break point A to the break point C for an arrangement with a characteristic 21 in FIG. 3. The diode 82 and the resistor 83 determine the variation of the characteristic 21 (FIG. 3) in the region 70 of the third quadrant. The diode 84, the zener diode 85 and the resistor 86 determine the variation of the characteristic 21 (FIG. 3) in the region 72 beyond the break point C.

Figure 6:
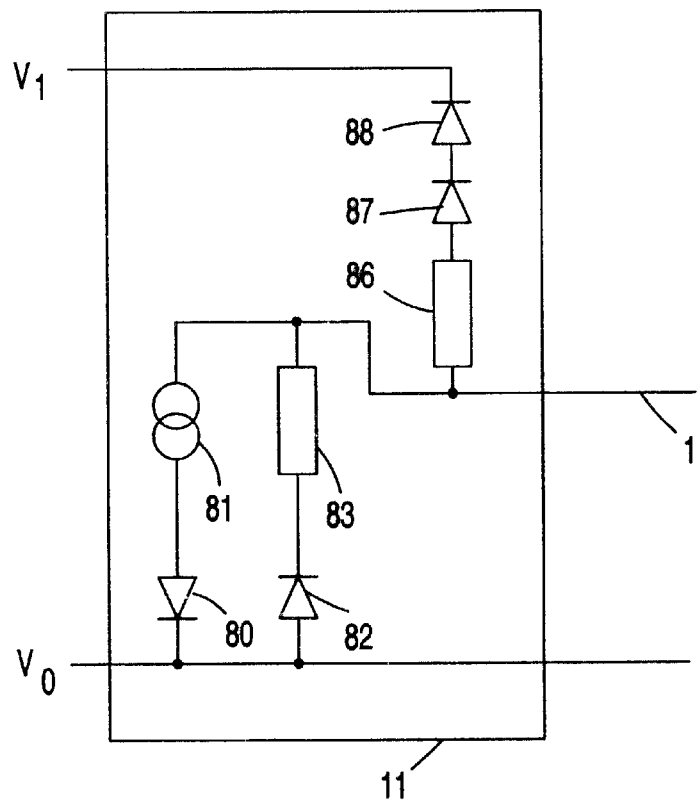
FIG. 6 shows a circuit arrangement for the termination arrangement for the recessive level on the lead 1.

FIG. 6 shows a further circuit arrangement for the termination of the recessive level on the lead 1. Like in FIG. 5, the diode 80 and the current source 81 are intended for the region 71 between the break point A and the break point C. The diode 82, connected parallel to this branch, in series with the resistor 83, determines the variation of the characteristic 21 (FIG. 3) in the region 70 in the third quadrant. The resistor 86 and two series-connected diodes are clamped to the voltage $V_1$ and govern the region 72 beyond the break point C.

Figure 7:
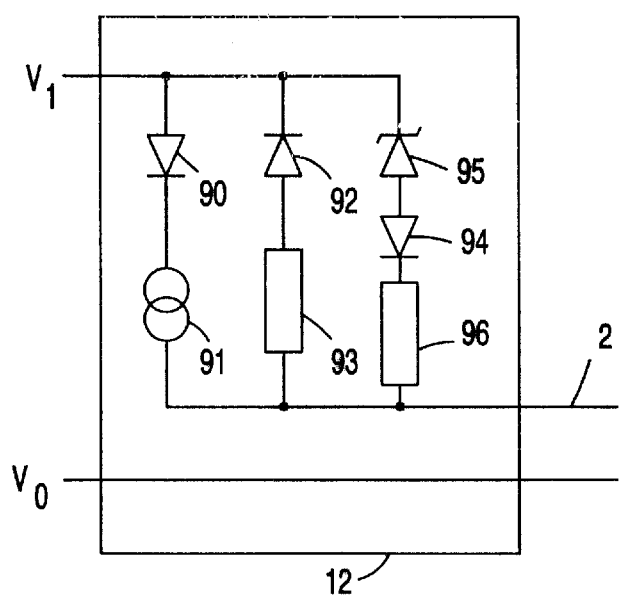
FIG. 7 shows a circuit arrangement for the termination arrangement for the recessive level on the lead 2.

FIG. 7 shows a circuit arrangement for means 12 for adjusting the recessive level on the lead 2. To this end, the recessive level, being complementary to the recessive level of the means 11 in FIG. 5, is adjusted from the voltage $V_1$. The diode 90 and the current source 91 are responsible for the variation of the characteristic 27 (FIG. 4) in the region 74. The branch which is connected parallel to this branch and consists of a resistor 93 and a diode 92 essentially determines the variation of the characteristic 27 (FIG. 4) in the region 75 in the first quadrant of the current/voltage diagram. The variation of the characteristic 27 (FIG. 4) in the region 73 in the third quadrant is determined essentially by the branch which consists of a zener diode 95, a diode 94 which is connected in series therewith and a resistor 96 and which is clamped between the voltage $V_1$ and the lead 2.

Figure 8:
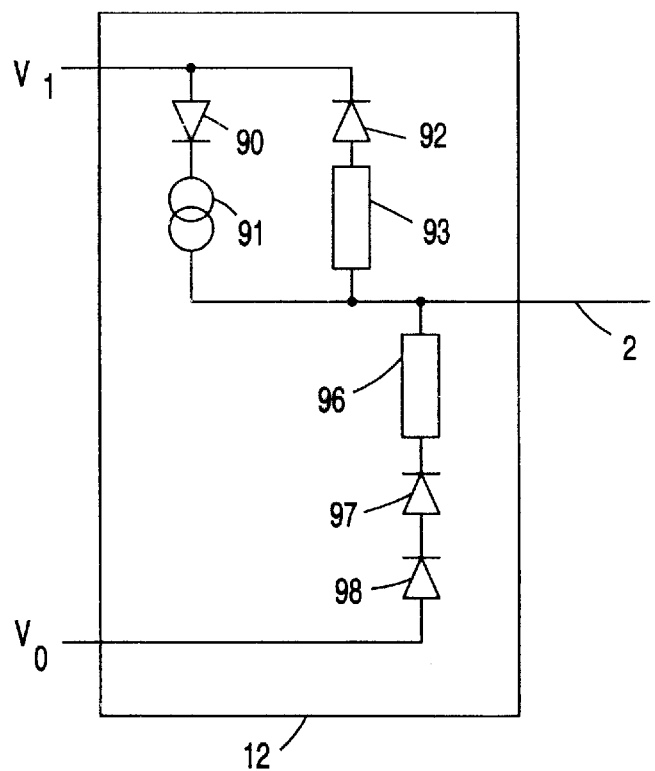
FIG. 8 shows a circuit arrangement for the termination arrangement for the recessive level on the lead 2.

FIG. 8 shows a further circuit arrangement for feeding a recessive level to the lead 2. In comparison with FIG. 7, the branch of the driver which determines the variation of the characteristic 27 in the region 73 in this circuit arrangement is clamped to the voltage $V_0$ via the resistor 96 and the diodes 97 and 98 which are connected in series therewith.

What is claimed is:

1. A circuit arrangement for bias adjustment of bus signal levels for a system for the transmission of data via at least one lead whereto a plurality of stations with transmitters and receivers with preceding low-pass filters are connected, which lead carries a recessive signal level and can be switched to a dominant signal level by a transmitter, wherein the stations are provided with a termination arrangement which provides low-impedance termination of the lead in the case of a signal level beyond the dominant signal level, wherein the recessive level can be adjusted by means of a current source arrangement in the transmitter, and that a current/voltage characteristic of the termination arrangement includes a plurality of segments, wherein current/voltage characteristic of a first segment rises from the zero point with a positive rise and is limited with a constant current for a voltage from below a receiving threshold to a voltage beyond the dominant level.

2. A circuit arrangement as claimed in claim 1, wherein the current/voltage characteristic segments are programmable.

3. A circuit arrangement as claimed in claim 1, wherein an impedance in a third segment of the current/voltage characteristic of the termination arrangement is higher than that in the first segment.

4. A circuit arrangement as claimed in claim 1, wherein the leads are driven with complementary signal levels.

* * * * *